Sept. 1, 1959
H. BEUTHER ET AL
2,902,440
PROCESS FOR UTILIZING IMPURE HYDROGEN STREAM
IN HYDROGENATION REACTIONS
Filed July 12, 1957
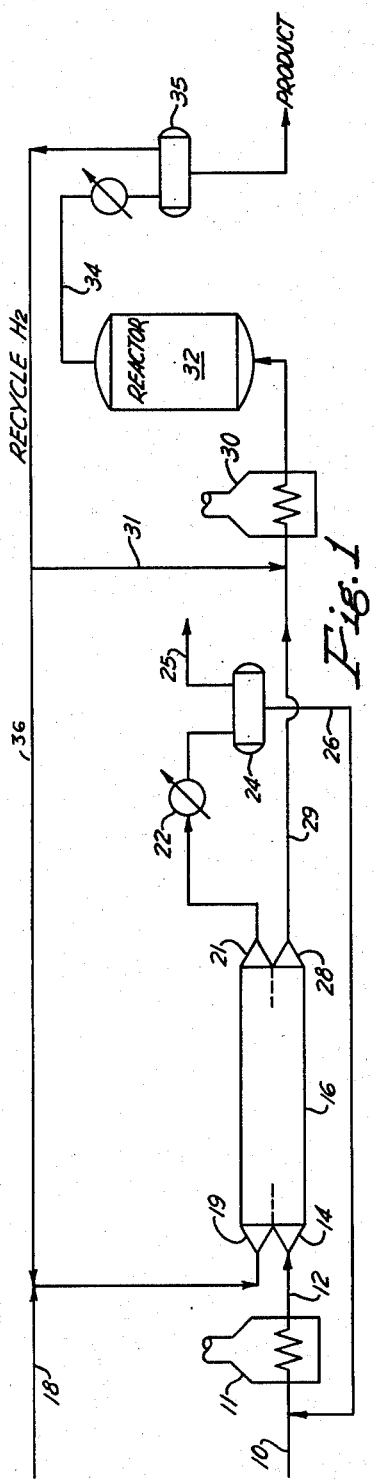
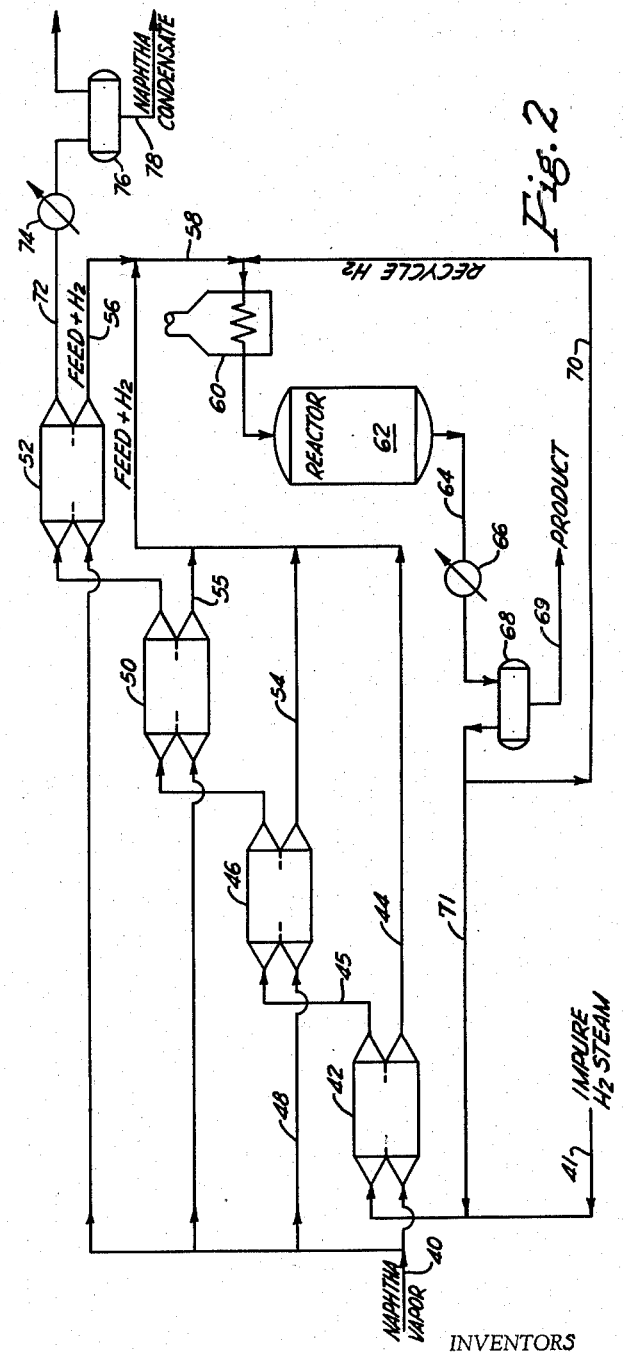
INVENTORS
HAROLD BEUTHER &
ALFRED M. HENKE
BY
THEIR ATTORNEY

United States Patent Office 2,902,440
Patented Sept. 1, 1959

2,902,440

PROCESS FOR UTILIZING IMPURE HYDROGEN STREAM IN HYDROGENATION REACTIONS

Harold Beuther and Alfred M. Henke, Pittsburgh, Pa., assignors to Gulf Research & Development Company, Pittsburgh, Pa., a corporation of Delaware Application July 12, 1957, Serial No. 671,498

4 Claims. (Cl. 208—210)

This invention relates to a process for treatment of organic compounds with hydrogen in the presence of a catalyst and more particularly to such a process in which at least a portion of the hydrogen employed in the treatment is recovered from a low purity hydrogen stream.

The petroleum and chemical industries employ a number of processes for treating organic compounds with hydrogen. For example, in the petroleum industry hydrogen-treating processes for desulfurizing and otherwise upgrading petroleum fractions are applied to sulfur-containing crude oils, to heavy residual and distillate fractions and to olefinic and sulfur-containing naphthas. In processes of this type the petroleum fraction is contacted with a hydrogenating catalyst such as cobalt-molybdena on alumina or molybdena on alumina at moderate to high temperature and pressure in the presence of a high concentration of hydrogen, for example, from 1000 to 20,000 standard cubic feet per barrel of hydrocarbon. In the chemical industry, the hydrogenation of coal tar and unsaturated vegetable oils is well known. Certain well-known synthesis processes also use hydrogen as a reactant. These include the Oxo process in which olefinic hydrocarbons are reacted with carbon monoxide and hydrogen in the presence of a suitable catalyst and the Fisher-Tropsch process in which carbon monoxide and hydrogen are reacted over an iron-type catalyst.

In all of these hydrogen treating processes in which there is a net consumption of hydrogen, the supply of make-up hydrogen is an expensive factor. Normally, the unconsumed hydrogen is separated from the product by partial condensation and is recycled to the reaction. Make-up hydrogen is added to compensate for the hydrogen consumed in the reaction. In many of these processes a certain minimum partial pressure of hydrogen must be maintained to avoid rapid catalyst deactivation. The recycle hydrogen stream normally contains a substantial concentration of impurities such as low boiling hydrocarbons and therefore the make-up hydrogen must be of reasonably high purity as otherwise an excessively high total pressure may be required for maintaining the minimum hydrogen partial pressure. The necessary purity of the hydrogen will differ somewhat in the different processes but in all cases a high purity hydrogen make-up stream is preferred to a low purity stream.

The supply of high purity hydrogen to a hydrogen consuming process is one of the more costly features of such processes and considerable savings can be realized if low purity hydrogen streams available from other plant operations can be used. We have now developed a process in which at least a portion of the high purity make-up hydrogen can be obtained inexpensively from low purity streams which would normally not be useable for that purpose.

In general, our process comprises passing a gaseous mixture containing hydrogen in concurrent, horizontal, laminar flow with a vaporized feed stock for a hydrogen treating process through an unobstructed separating zone maintained at substantially constant temperature throughout its extent. Two gas streams are recovered from said zone, one of said streams comprising the feed stock to the hydrogen treating process enriched in hydrogen. This latter stream is maintained in the vapor phase and is passed in contact with a hydrogenating catalyst at elevated temperature and pressure. Additional hydrogen, such as recycle hydrogen, can then be added to the mixture of hydrogen and the feed stock before it is passed to the catalytic conversion zone.

In one preferred embodiment of our process the laminar flow of the hydrogen-containing gas and of the vaporized feed stock is carried out in stages so as to obtain a reasonably high recovery of high purity hydrogen from the low purity hydrogen stream. The feed stock is divided into a plurality of streams. One stream is passed in first stage laminar contact with the hydrogen-containing gas. Another portion is passed in laminar contact with the gas of reduced hydrogen content, withdrawn from the first stage contact and other portions of the feed stock are contacted with gas streams of reduced hydrogen content from subsequent stages. The feed stock vapor streams from each of said stages are then combined and charged to the catalytic conversion zone, preferably after further addition of hydrogen, for example, recycle hydrogen.

As indicated above, our process has two essential stages: a diffusion stage and a catalytic reaction stage. The diffusion stage employs the principles of the diffusional separation process described in the patent application of Alfred M. Henke and William A. Horne, Serial No. 671,497 filed concurrently herewith. The said application describes the separation of preferentially diffusible components of a gaseous mixture from the less diffusible components by the flowing of the gas mixture in laminar contact with a readily condensable filtering gas. The more diffusible components diffuse preferentially into the filtering gas, the filtering gas is condensed and a gas rich in the more diffusible components is recovered from the condensate. In our present process an impure stream of hydrogen is flowed in laminar contact with a vapor stream composed of the feed stock for a subsequent catalytic conversion in the presence of hydrogen. The hydrogen diffuses preferentially into the feed stock stream, and the feed stock containing diffused hydrogen, preferably after further addition of hydrogen such as recycled hydrogen, is passed to the catalytic conversion zone, where the feed stock is hydrogenated or otherwise catalytically converted in a hydrogen atmosphere.

We will describe our process in more detail by referring to the drawing, of which:

Figure 1 is a flow diagram of the use of our process in the hydrogen treating of an olefinic naphtha or gasoline, and Figure 2 is a flow diagram of a modification of the process in which the enrichment of the feed stock with hydrogen from an impure hydrogen stream is performed in a series of stages.

The application of the process of the invention to the hydrogen treating of an olefinic, sulfur-containing gasoline is shown diagrammatically in Figure 1. A thermally cracked gasoline of high olefin and sulfur content is introduced to the system via line 10. The naphtha is heated to vaporization temperature in the heater 11 and is passed by line 12 to the lower inlet conduit 14 of a diffusion separation chamber 16. An impure stream of hydrogen, for example, a stream containing 50 volume percent hydrogen and the balance methane and higher hydrocarbons, is introduced via line 18 to the upper inlet conduit 19 of separation chamber 16. The hydrogen, which is the more diffusible component of the gas mixture flowing in the upper level of chamber 16, diffuses preferentially into the vaporized naphtha stream flowing in the lower level of the chamber. The other components of the recycle gas mixture also diffuse to some extent into the naphtha vapor stream, but the hydrogen diffuses at a greater rate. Consequently, the total amount of gas diffusing into the naphtha stream is much richer in hydrogen than is the impure hydrogen stream introduced via line 18.

At the outlet end of chamber 16 two gas streams are withdrawn. A gas stream depleted in hydrogen is withdrawn from the outlet conduit 21. This stream is passed through a cooler 22 where it is cooled sufficiently to condense any gasoline range hydrocarbons that diffuse from the naphtha feed stock into the upper gas stream. In the vapor-liquid separator 24 condensed hydrocarbons are separated from the lighter gases which are withdrawn by line 25. The condensate is withdrawn via line 26 and is recirculated to the feed stream in line 10.

From the lower outlet conduit 28 of chamber 16 the naphtha vapor stream containing high purity diffused hydrogen is withdrawn and is passed via line 29 to the preheater 30. Recycle hydrogen is introduced via line 31 in advance of the heater 30. The feed stream comprising naphtha and hydrogen is passed through the catalytic reactor 32. The product withdrawn overhead via line 34 is cooled to condense the normally liquid components. Recycle gas is separated from the condensate in separator 35 and is returned to the feed stream via line 31 as described above. A portion of the recycle gas can be passed via line 36 to the impure hydrogen feed line 18. This makes it possible to maintain sufficient purity of the recycle gas and to vent excess gas via line 25.

An essential feature of the separation carried out in chamber 16 is that the impure hydrogen stream and the hydrocarbon vapor stream are passed in laminar, concurrent flow. To insure the maintenance of laminar, concurrent flow certain other features of the contact in chamber 16 are essential. For example, it is essential that the hydrogen stream and the hydrocarbon stream be flowed horizontally through the separating chamber. It is also essential that the more dense of the two vapor streams be flowed through the lower level of the separating chamber while the less dense stream flows above it. This reduces the possibility of non-diffusional mixing of the gas streams by gravitational effects. In substantially all of the hydrogen treating processes to which our invention applies, the impure stream of hydrogen will be the less dense of the two vapor streams and will be flowed through the upper level of the separating chamber.

Another important feature of the diffusional contact is that it is carried out substantially isothermally. That is to say, the diffusion separation chamber is maintained at substantially uniform temperature throughout, thus reducing the possibility of convection currents which could cause mixing of the gas streams other than the desired diffusion.

The diffusion separation stage of our process can be operated successfully over considerable ranges of temperature and pressure. However, the diffusional contact of the impure hydrogen stream and the feed stock must be carried out in the vapor phase. Therefore, a temperature sufficiently high to vaporize the feed stock must be maintained in the separation chamber. As shown in Figure 1, the naphtha stream is heated to vaporization temperature in the preheater 11. Preferably, to avoid convection currents the impure hydrogen stream introduced through line 18 is at the same temperature. The separation chamber 16 can be provided with suitable means for maintaining uniform temperature throughout its extent. Such means can include insulation or a heating jacket, not shown in the drawing.

The gas streams are introduced to and withdrawn from the separating chamber in such a way as to avoid turbulence. Thus, as shown in Figure 1, the separating chamber is provided with inlet and outlet conduits designed to aid in creating streamline flow. Thus, as shown in Figure 1, these conduits are of tapered design and they introduce the gas into the separating chamber with the minimum of turbulence.

The diffusional separation zone in the separating chamber is entirely unobstructed. The two gas streams flow concurrently through the chamber, one above the other, and the hydrogen, which is the more diffusible component of the hydrogen stream, diffuses into the hydrocarbon stream at a more rapid rate than the other components of the hydrogen stream. Small amounts of the other components in the hydrogen stream, for example, methane, will also diffuse into the hydrocarbon stream but the concentration of hydrogen in the total gas that diffuses into the hydrocarbon stream is much higher than the concentration in the impure stream introduced via line 18. A small amount of the hydrocarbon vapors similarly diffuses into the hydrogen stream. This is recovered from the overhead stream by partial condensation and returned to the feed line.

Since avoidance of turbulence is an essential feature of the separation stage, the temperature of chamber 16 must be maintained below the decomposition temperature of the gas streams passing through it because thermal decomposition resulting in volume changes would upset the laminar flow. If necessary, a subatmospheric pressure can be maintained in the separating chamber to maintain vaporization at a sufficiently low temperature.

As we have said, our process can be applied to a wide range of hydrogen treating procedures. The material to be treated must be vaporizable. However, in the case of very heavy hydrocarbons such as lubricating oil fractions, crude oils and the like, our process can be applied by vaporizing a portion of the material to be hydrogen treated, passing the vaporized portion in diffusional contact with an impure hydrogen stream in accordance with our procedure, and recombining the hydrogen-containing vapors with the unvaporized residue before introduction into the catalytic hydrogenation vessel.

Figure 2 is a flow diagram of an embodiment of our process in which the diffusion of hydrogen from an impure hydrogen stream into the feed stock for catalytic conversion is carried out in a series of stages. Figure 2 illustrates this embodiment of the process for the hydrogen treating of an olefinic naphtha. The vaporized naphtha enters the system via line 40 and is introduced into the lower inlet conduit of the first stage diffusion chamber 42. An impure stream of hydrogen, for example, an impure stream of excess recycle hydrogen from catalytic reforming of straight run naphtha, which contains approximately 60 volume percent hydrogen and the rest methane and higher hydrocarbons is introduced via line 41 into the upper inlet conduit of chamber 42. From the lower outlet conduit of chamber 42 a stream of naphtha containing diffused hydrogen is withdrawn via line 44. From the upper outlet conduit a gaseous stream of impure hydrogen somewhat lower in hydrogen content than the stream introduced via line 41 is withdrawn via line 45 and is introduced into the upper inlet conduit of diffusion chamber 46. Another portion of the feed naphtha from line 40 is introduced via line 48 into the lower inlet conduit of chamber 46 and is passed in laminar flow through the chamber in contact with the concurrently flowing upper layer of impure hydrogen. The lower stream enriched in hydrogen and the upper stream depleted in hydrogen are withdrawn in the same manner as described for the first diffusion stage carried out in chamber 42. Similar treatment of other portions of the feed naphtha occur in chamber 50 wherein the depleted hydrogen stream from chamber 46 is flowed and in chamber 52 where the depleted hydrogen stream from chamber 50 is flowed. The naphtha streams containing diffused hydrogen are withdrawn via line 44 from chamber 42, via line 54 from chamber 46, via line 55 from chamber 50, and via line 56 from chamber 52 are combined in line 58 and passed through the preheater 60. The naphtha stream mixed with hydrogen is then heated to reaction temperature and introduced into the catalytic reactor 62. The product steam is withdrawn via line 64, partially condensed in cooler 66, and passed to the vapor-liquid separator 68. The condensed product is withdrawn via line 69 and recycle hydrogen is returned via line 70 for mixing with the feed stock in advance of the preheater. As in the apparatus of Figure 1, a portion of the recycle gas stream can be passed via line 71 to the impure hydrogen feed line 41. The depleted hydrogen stream withdrawn from the upper level of the last diffusion stage in chamber 52 is reduced in hydrogen content to about 20 percent and further recovery of hydrogen from this stream by diffusion is not practicable. This stream, however, contains a small concentration of naphtha vapor that has diffused into the gaseous streams in the four diffusional contact stages. Therefore, the gas stream withdrawn by line 72 is cooled in cooler 74 to condense the naphtha range hydrocarbons. Gas is separated from the condensate in separating drum 76 and the condensate withdrawn by line 78 is recycled to the feed inlet line 40.

The following example illustrates the results that are obtainable in the hydrogen treating of an olefinic naphtha by the process of our invention.

*Example*

The feed stock is a heavy catalytically cracked naphtha having the following characteristics:

| | |
|---|---|
| Gravity, °API | 47.7 |
| Boiling range, ° F. | 300–410 |
| Aromatics, volume percent | 32 |
| Olefins, volume percent | 40 |
| Saturates, volume percent | 28 |

The impure hydrogen stream is a stream of excess recycle gas from the reforming of a straight run naphtha over a platinum-alumina catalyst and has the following composition: 64 volume percent hydrogen, 30 volume percent methane, 6 volume percent ethane, etc. The olefinic naphtha is vaporized by heating to a temperature of 410° F. and the vapors are charged at a rate of 8 s.c.f./hr. to the lower level of a diffusion separation chamber, as illustrated in the drawings, of which the unobstructed diffusion separation zone is of rectangular cross section and has a length of 30 inches, a width of 4 inches and a height of 3.1 inches. The impure hydrogen stream at a temperature of 410° F. is introduced at a rate of 8 s.c.f./hr. to the upper level of the diffusion separation chamber. The gas streams pass in laminar flow through the chamber at a linear rate of .05 foot/second. From the upper exit conduit of the separation chamber a gas stream of the following composition is withdrawn: 59.0 volume percent hydrogen, 33.6 volume percent methane and 7.1 volume percent ethane, etc. From the lower exit conduit is withdrawn a vapor stream comprising the olefinic naphtha and the diffused hydrogen-rich gas. The diffusion into the naphtha stream amounts to 285 standard cubic feet per barrel of naphtha of a gas containing 82.8 volume percent hydrogen, 16.4 percent methane and 0.8 percent ethane and other hydrocarbons. The recovery of hydrogen from the impure stream amounts to 26.7 volume percent. A recycle stream of hydrogen containing 90 volume percent hydrogen is then introduced into the naphtha stream. The mixed stream is heated to 750° F. and is charged to a catalytic reactor containing a fixed bed of cobalt-molybdena on alumina catalyst. The normally liquid hydrocarbons of the reactor effluent are separated from light gases such as hydrogen, methane and $H_2S$; the hydrogen is separated from $H_2S$ and is recycled to the reactor feed stream and a substantially sulfur-free saturated naphtha is recovered as product.

The effect of changing different variables in the diffusional separation stage of our process has been discussed in the co-filed patent application, of Henke and Horne, referred to above. However, a brief discussion of these variables will be given. The contact time or the length of time during which the impure hydrogen stream and the feed stock vapor for hydrogen treating are in laminar contact in the diffusional separation zone is an important variable. In general, long contact time results in a high recovery of hydrogen from the impure stream; that is, the total amount of hydrogen diffusing into the feed stock vapor is large. However, long contact time also results in a low hydrogen purity of the total gas diffusing into the feed stock vapor. Conversely, short contact time results in low hydrogen recovery and high purity of the hydrogen that diffuses. The contact time is controlled by the linear rates of flow of the two gas streams and by the length of the diffusional separation zone. We have found that a contact time of about 10 to 300 seconds results in reasonably high recovery of reasonably pure hydrogen in the feed stock vapor stream.

Another variable is the concentration of hydrogen in the impure hydrogen stream. We can employ hydrogen streams of considerable ranges of purity. The diffused gas is more highly concentrated in hydrogen if the original hydrogen stream is of high purity, but hydrogen streams containing as little as 20 volume percent hydrogen can be employed in our process. Preferably, the impure hydrogen stream contains at least about 40 volume percent hydrogen.

Another variable is the ratio of the flow rates of the impure hydrogen stream and the feed stock vapor stream. In the example discussed above, good results are obtained with equal flow rates of the two streams. The highest hydrogen recovery is obtained when the rate of flow of the feed stock vapor exceeds that of the impure hydrogen stream but the purity of the recovered hydrogen is lower than when equal rates are employed. Still another variable is the rate of withdrawal of the two product streams. It is normally preferred to withdraw the upper and lower product streams at the same rates at which the upper and lower inlet streams are introduced. However, when the amount of hydrogen to be diffused into the lower stream is very great, it can be advantageous to withdraw the lower gas stream at a higher rate than the upper gas stream.

As we have shown in the drawing, the diffusional separation chamber at its inlet end is provided with a pair of inlet conduits, one of which overlies the other, and an aligned pair of outlet conduits at the exit end. These conduits are of tapered structure, the smaller end thereof being connected to piping for introducing or withdrawing gas. Any suitable tapered structure, such as pyramidal or conical can be used, the essential feature being that the structure is conducive to the introduction or withdrawal of a streamline flow of gas.

Obviously many modifications and variations of the invention as hereinbefore set forth may be made without departing from the spirit and scope thereof and therefore only such limitations should be imposed as are indicated in the appended claims.

We claim:

1. A process for catalytic treatment of organic compounds and mixtures thereof with hydrogen, under conditions resulting in a net consumption of hydrogen, at least a portion of which is obtained from a low purity hydrogen stream, which comprises passing a low purity hydrogen stream above and in concurrent, horizontal, laminar flow with a vaporized stream of a feed stock to be catalytically converted in the presence of hydrogen through an unobstructed, isothermal diffusion zone, withdrawing upper and lower gas streams from said zone, said lower gas stream comprising said feed stock and diffused hydrogen, maintaining said feed stock and diffused hydrogen in the vapor phase, and contacting said feed stock-hydrogen mixture with a hydrogenating catalyst at elevated temperature and pressure.

2. A process for catalytic treatment of organic compounds and mixtures thereof with hydrogen, under conditions resulting in a net consumption of hydrogen, at least a portion of which is obtained from a low purity hydrogen stream, which comprises passing a low purity hydrogen stream above and in concurrent, horizontal, laminar flow with a vaporized stream of a feed stock to be catalytically converted in the presence of hydrogen through an unobstructed, isothermal diffusion zone, withdrawing upper and lower gas streams from said zone, said lower gas stream comprising said feed stock and diffused hydrogen, maintaining said feed stock and diffused hydrogen in the vapor phase, contacting said feed stock-hydrogen mixture with a hydrogenating catalyst at elevated temperature and pressure, separating a hydrogen-containing gas from the product of said catalytic contact and recycling said hydrogen containing gas to the lower gas stream withdrawn from said diffusion zone before said subsequent catalytic contact.

3. A process for catalytic treatment of organic compounds and mixtures thereof with hydrogen under conditions resulting in a net consumption of hydrogen, at least a portion of which is obtained from a low purity hydrogen stream, which comprises dividing the feed stock to be treated with hydrogen into a plurality of portions, in a first diffusion separation stage passing a low purity hydrogen stream above and in concurrent, horizontal, laminar flow with a vaporized first portion of said feed stock through an unobstructed, isothermal diffusion zone, withdrawing upper and lower gas streams from said zone, said lower gas stream comprising said first portion of said feed stock and diffused hydrogen and said upper gas stream comprising said low purity hydrogen stream depleted in hydrogen, in at least one subsequent diffusion separation stage passing the depleted hydrogen stream from the previous diffusion separation stage in concurrent, horizontal, laminar flow with another vaporized portion of said feed stock through another unobstructed isothermal diffusion zone, withdrawing upper and lower gas streams from each subsequent diffusion zone, said lower gas stream comprising a portion of the feed stock and diffused hydrogen, combining the lower gas streams from each of said diffusion separation zones thus forming a mixed stream of feed stock and diffused hydrogen, maintaining said mixture of feed stock and diffused hydrogen in the vapor phase, contacting said feed stock-hydrogen mixture with a hydrogenating catalyst at elevated temperature and pressure, separating a hydrogen-containing gas from the product of said catalytic contact and recycling said hydrogen-containing gas to the combined mixtures of feed stock and diffused hydrogen from said diffusion zones before said subsequent catalytic contact.

4. A process for hydrogen treating a heavy hydrocarbon oil under conditions such that at least a portion of the oil is in the liquid phase during the hydrogen treatment which comprises partially vaporizing said oil and separating the vapor and liquid, passing a low purity hydrogen stream above and in concurrent, horizontal, laminar flow with the vaporized portion of said oil through an unobstructed, isothermal diffusion zone, withdrawing upper and lower gas streams from said zone, said lower pas stream comprising said oil vapor and diffused hydrogen, maintaining said oil vapor and diffused hydrogen in the vapor phase, mixing the unvaporized portion of said oil with the oil vapor and diffused hydrogen and contacting the hydrocarbon-hydrogen mixture with a hydrogenating catalyst at elevated temperature and pressure.

References Cited in the file of this patent
UNITED STATES PATENTS

| | | |
|---|---|---|
| 1,174,631 | Snelling | Mar. 7, 1916 |
| 2,609,382 | Mayland | Sept. 2, 1952 |
| 2,770,578 | Haensel | Nov. 13, 1956 |